United States Patent [19]

Nassry et al.

[11] 4,312,768

[45] Jan. 26, 1982

[54] SYNERGISTIC POLYETHER THICKENERS FOR WATER-BASED HYDRAULIC FLUIDS

[75] Inventors: Assadullah Nassry, Riverview; Jerrold F. Maxwell, Woodhaven; John W. Compton, Taylor; Edward J. Panek, Trenton; Pauls Davis, Gibraltar, all of Mich.

[73] Assignee: BASF Wyandotte Corporation, Wyandotte, Mich.

[21] Appl. No.: 140,329

[22] Filed: Apr. 24, 1980

Related U.S. Application Data

[63] Continuation-in-part of Ser. No. 86,814, Oct. 22, 1979, abandoned.

[51] Int. Cl.$^3$ .................. C09K 3/00; C10M 3/04; C10M 3/06; C10M 3/16
[52] U.S. Cl. .................. 252/32.7 E; 252/49.3; 252/49.5; 252/73; 252/74; 252/75; 252/76; 252/52 A; 252/389 R; 252/390; 252/391; 568/624
[58] Field of Search ............ 252/73, 74, 75, 76, 252/49.3, 49.5, 32.7 E, 52 A, 316; 568/624, 608

[56] References Cited

U.S. PATENT DOCUMENTS

| | | | |
|---|---|---|---|
| 3,249,538 | 5/1966 | Freier | 252/18 |
| 3,748,276 | 7/1973 | Schmolka | 252/316 |
| 3,933,658 | 1/1976 | Beiswanger et al. | 252/31 |
| 3,970,569 | 7/1976 | Sturwold et al. | 252/49.3 |
| 4,138,346 | 2/1979 | Nassry et al. | 252/32.5 |
| 4,151,099 | 4/1979 | Nassry et al. | 252/32.7 E |

Primary Examiner—Dennis L. Albrecht
Attorney, Agent, or Firm—Andrew E. Pierce

[57] ABSTRACT

Water-based hydraulic fluids and metalworking lubricants are disclosed which are thickened with a polyether polyol having a molecular weight of about 1000 to about 75,000 modified with an alpha-olefin epoxide having about 12 to about 18 carbon atoms. Unexpectedly, synergistic thickening results from a combination of said polyether polyol with the components of a water-based hydraulic fluid or metalworking lubricant. The particularly effective components of the hydraulic fluid or metalworking lubricant are the phosphate ester and water-soluble amine corrosion inhibitor components. The hydraulic fluid and metalworking fluids of the invention also contain a water-soluble polyoxyethylated ester of an aliphatic acid and a monohydric or polyhydric aliphatic alcohol, either one or both said acid and said alcohol being polyoxyethylated, a sulfurized molybdenum or antimony compound and a metal deactivator as well as other adjuvants conventional in this art.

15 Claims, No Drawings

SYNERGISTIC POLYETHER THICKENERS FOR WATER-BASED HYDRAULIC FLUIDS

CROSS REFERENCE TO RELATED APPLICATIONS

This is a continuation-in-part of copending application Ser. No. 86,814, filed Oct. 22, 1979 now abandoned.

BACKGROUND OF THE INVENTION

1. Field of the Invention

This invention relates to water-based hydraulic fluids and metalworking compositions.

2. Prior Art

In the technology of hydraulic power transmission, mechanical power is imparted to a fluid called "a hydraulic fluid" in the form of pressure by means of a hydraulic pump. Power is utilized where desired by tapping a source of said hydraulic fluid and thus transforming the power as pressure back to mechanical motion by a mechanism called a hydraulic motor. The hydraulic fluid is utilized as a pressure and volume transmitting medium. Any non-compressible fluid can perform this function. Water is the oldest fluid used for this purpose and is still sometimes used alone for this purpose. In the prior art, there has been a heavy emphasis on the development of petroleum oils for use as hydraulic fluids and, consequently, much of the equipment utilized with hydraulic fluids has been designed and manufactured specifically for use with petroleum oils. A petroleum oil in comparison with water as a hydraulic fluid possesses the advantage of inhibiting the development of rust of the ferrous components of the mechanical equipment utilized in conjunction with hydraulic fluids, (i.e., hydraulic pumps, motors, etc.) and in preventing wear of the machinery since the hydraulic fluid must lubricate the equipment. Petroleum oils have a second advantage over the use of water as a hydraulic fluid in that the petroleum oils normally exhibit a substantially higher viscosity than water and thus contribute to reduction of the leakage of the fluid in the mechanical equipment utilized. In addition, the technology relating to additives for petroleum oils has developed to such an extent that the viscosity, foam stability, wear prevention and corrosion prevention properties of such petroleum oil based hydraulic fluids can be further enhanced by the use of said additives.

Over the past 25 years, various substitutes for petroleum oil base hydraulic fluids have been developed in order to overcome one of the major deficiencies of petroleum oils, namely, flammability. Recent interest in the use of hydraulic fluids having up to 99 percent or more of water has resulted from the higher cost of petroleum oils and recent emphasis on problems of ecologically suitable disposal of contaminated or spent petroleum oil based hydraulic fluids.

Metalworking fluids of the so-called "soluble oil" type have been considered for use as hydraulic fluids. Such fluids contain mineral oil and emulsifiers as well as various additives to increase corrosion resistance and improve antiwear and defoaming properties. Such fluids when used as hydraulic fluids are not generally suitable for use in ordinary industrial equipment designed specifically for use with the petroleum oil based hydraulic fluids since such fluids do not adequately prevent wear damage in pumps and valves of such equipment. However, such fluids have found application in specially designed, high cost, large size equipment which, because of said large size and thus inflexibility, is not suitable for use in most industrial plants. The soluble oil hydraulic fluid usage has thus been quite limited; usage has been largely confined to large installations where flexibility and size are not critical such as in steel mills.

It is known from U.S. Pat. No. 3,249,538 to prepare an aqueous lubricant concentrate and lubricating composition consisting essentially of molybdenum disulfide and a water-soluble viscosity increasing agent such as polyvinyl alcohol and an emulsifiable mineral oil. It is also known from U.S. Pat. No. 3,970,569 to prepare aqueous lubricating compositions containing a water-soluble mixed ester obtained by transesterification of a polyoxyethylene glycol and a triglyceride.

It is also known from U.S. Pat. No. 3,933,658 that a mixture of a phosphate ester and a sulfur compound can be used in a water-based metalworking composition to obtain extreme pressure, antiwear and corrosion inhibiting properties. Such additives are used with a suitable vehicle such as mineral oil, vegetable oil, aliphatic acid ester, etc. The sulfur compounds disclosed are not sulfurized molybdenum compounds but rather are derivatives of 2-mercaptobenzothiazole. The phosphate esters of the invention, however, are similar to those disclosed in this reference. These are alkylene oxide derivatives of an alkyl, aryl or arylalkyl phosphate which are useful in the form of the free acid or in the neutralized for wherein the phosphate ester is neutralized with a metal hydroxide or carbonate, ammonia or an amine. The use of these phosphate esters in water-based metalworking fluids is suggested in ASLE Transactions 7, pages 398 to 405, at page 405.

It is also known from U.S. Pat. Nos. 4,151,099 and 4,138,346 to prepare water-based hydraulic fluids and metalworking lubricants. These hydraulic fluids which contain a phosphate ester and a sulfur compound or alternatively a phosphate ester, a sulfur compound and a water-soluble polyoxyethylated aliphatic ester are optionally thickened with a polyglycol thickener but there is no suggestion in these references, or in any of the references above, that such fluids can be provided by the utilization of an alpha-olefin epoxide-modified polyether polyol thickener which reacts synergistically with certain components of the hydraulic fluid, particularly the phosphate ester or the phosphate ester and amine components to provide greatly increased viscosity in the resultant fluids.

SUMMARY OF THE INVENTION

This invention relates to thickened high-viscosity, water-based hydraulic fluids and metalworking fluids. Said fluids comprise a water-soluble polyoxyethylated aliphatic ester, a sulfurized metallic compound, a phosphate ester salt, and a polyether polyol (polyether) thickening agent. Optionally, the fluids of the invention can include a vapor or liquid phase corrosion inhibitor and a metal deactivator. Combination of said fluids with a polyether polyol thickening agent, which is a high molecular weight polyether polyol derived from the reaction of ethylene oxide or ethylene oxide and at least one lower alkylene oxide having 3 and 4 carbon atoms with an active hydrogen-containing initiator containing at least two active hydrogens and having a molecular weight of about 1000 to about 75,000, preferably about 1000 to about 40,000, further modified by reaction with an alpha-olefin epoxide (oxide) having 12 to 18 carbon atoms, unexpectedly provides a surprising increase in viscosity, said increase not being simply additive.

The concentrates of the invention can be used when blended with a substantial amount of water as a flame-retardant hydraulic fluid having excellent lubricity and antiwear characteristics or as metalworking compositions used to cool and lubricate surfaces which are in frictional contact such as during the operations of turning, cutting, peeling, grinding metals and the like. The hydraulic fluids and metalworking compositions of the invention are ecologically superior to those fluids and metalworking emulsions of the prior art containing mineral oil or a glycol/water mixture.

DETAILED DESCRIPTION OF THE INVENTION AND THE PREFERRED EMBODIMENTS

In accordance with this invention, there are disclosed hydraulic fluids, metalworking fluids and lubricating concentrates which can be diluted with water as a base to prepare hydraulic fluids or metalworking compositions. The disclosed compositions provide the desirable lubricity as well as antiwear properties which are necessary in a hydraulic fluid or a metalworking composition. The thickened hydraulic fluids and metalworking fluids of the invention can be prepared at such viscosities as to substantially prevent internal and external leakage in the mechanical parts of a hydraulic system during the pumping of such hydraulic fluids and where the fluids are utilized as metalworking fluids, the thickened fluids reduce spattering of the fluids which can occur under high speed metalworking operations. As is conventional in this art, corrosion inhibiting agents, defoamers, metal deactivators (chelating agents) can be used as part of the compositions of the invention.

The Ester of an Ethoxylated Aliphatic Acid or Alcohol

As an antiwear lubricant component of the lubricating concentrates of the invention and of the hydraulic fluids and metalworking additives of the invention, there are preferably utilized water-soluble esters of the ethoxylated $C_8-C_{36}$ aliphatic monohydric or polyhydric alcohols with aliphatic acids, and aliphatic dimer acids. Such ethoxylated esters have a hydrophilic-lipophilic balance (HLB) in the range of 10 to 20. The most desirable adducts are in the range of 13 to 18.

Useful ethoxylated aliphatic acids have about 5 to about 20 moles of ethylene oxide added per mole of acid. Examples are ethoxylated oleic acid, ethoxylated stearic acid and ethoxylated palmitic acid. Useful ethoxylated dimer acids are oleic dimer acid and stearic dimer acid. Aliphatic acids can be either branched or straight-chain and can contain from about 8 to about 36 carbon atoms. Useful aliphatic acids include azelaic acid, sebacic acid, dodecanedioic acid, caprylic acid, capric acid, lauric acid, oleic acid, stearic acid, palmitic acid and the like. Especially useful for the purpose of obtaining the water-soluble esters of this invention are aliphatic, preferably the saturated and straight-chain mono- and dicarboxylic acids containing from about 8 to 18 carbon atoms.

The dimer acids employed in the formation of the water-soluble esters employed in the aqueous lubricants of the present invention are obtained by the polymerization of unsaturated fatty acids having from 16 to 26 carbon atoms, or their ester derivatives. The polymerization of fatty acids to form the dimer fatty acids has been described extensively in the literature and thus need not be amplified here. The preferred dimer acids employed in the formation of the polyester are those which have 36 carbon atoms such as the dimer of linoleic acid and eleostearic acid. Other dimer acids having from 32 to 54 carbon atoms can be similarly employed. The dimer acids need not be employed in pure form and can be employed as mixtures in which the major constituent, i.e., greater than 50 percent, is the dimer acid and the remainder is unpolymerized acid or more highly polymerized acid such as trimer and tetramer acid.

The esters of the ethoxylated aliphatic acids and dimer acids utilized in the hydraulic fluids and metalworking lubricant compositions of the invention are reaction products of the ethoxylated monohydric or polyhydric alcohols.

Useful representative monohydric alcohols are n-octyl, n-decyl, n-dodecyl (lauryl), n-tetradecyl (myristyl), n-hexadecyl (cetyl) and n-octadecyl alcohol. Useful representative polyhydric alcohols are ethylene glycol, diethylene glycol, polyethylene glycol, sucrose, butanediol, butenediol, butynediol, hexanediol and polyvinyl alcohol. Glycerol, sorbitol, pentaerythritol, trimethylolethane, and trimethylolpropane are particularly useful polyhydric alcohols which can be ethoxylated and subsequently esterified to produce the esters of ethoxylated aliphatic alcohols useful as essential components of the hydraulic fluids and metalworking compositions of the invention.

Suitable monohydric aliphatic alcohols are generally those having straight chains and carbon contents of $C_8-C_{18}$. The alcohols are ethoxylated so as to add about 5 moles to about 20 moles of ethylene oxide by conventional ethoxylation procedures known to those skilled in the art. Such procedures are carried out under pressure in the presence of alkaline catalysts. The preferred monohydric aliphatic alcohols useful in producing the esters of the ethoxylated aliphatic alcohols of the invention are the linear primary alcohols having a chain length of $C_{12}-C_{15}$ and sold under the trademark "Neodol 25-3" and "Neodol 25-7" by the Shell Chemical Company.

Representative water-soluble polyoxyethylated esters having about 5 to about 20 moles of oxide per mole are the polyoxyethylene derivatives of the following esters; sorbitan monooleate, sorbitan trioleate, sorbitan monostearate, sorbitan tristearate, sorbitan monopalmitate, sorbitan monoisostearate, and sorbitan monolaurate.

Sulfurized Molybdenum and Antimony Compounds

The sulfurized oxymolybdenum or oxyantimony organo-phosphorodithioate additives of the invention are represented by the formula:

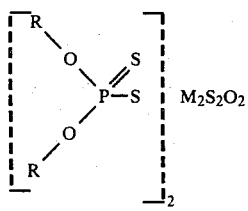

wherein M is molybdenum or antimony and R is organic and is selected from the group consisting of $C_3$–$C_{20}$ alkyl, aryl, alkylaryl radicals and mixtures thereof.

Representative useful molybdenum and antimony compounds are sulfurized oxyantimony or oxymolybdenum organo-phosphorodithioate where the organic portion is alkyl, aryl or arylalkyl and wherein said alkyl has a chain length of 3 to 20 carbon atoms.

The Phosphate Esters

The compositions of the invention contain a phosphate ester salt selected from the group consisting of

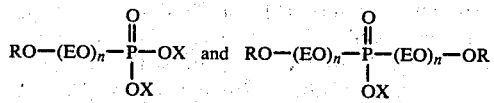

and mixtures thereof wherein ethylene oxide is represented by EO; R is selected from the group consisting of linear or branched chain alkyl groups or alkylaryl groups wherein said alkyl groups have about 6 to about 30 carbon atoms, preferably about 8 to about 20 carbon atoms, wherein the alkyl groups have about 6 to about 30 carbon atoms, preferably about 8 to about 18 carbon atoms and X is selected from the group consisting of the residue of ammonia or an amine and an alkali or alkaline earth metal or mixtures thereof and n is a number from 1 to 50. Metals such as lithium, sodium, potassium, ribidium, cesium, calcium, strontium, and barium are examples of X.

The phosphate ester salt composition utilized in the compositions of the invention are those more fully disclosed in U.S. Pat. Nos. 3,004,056 and 3,004,057, incorporated herein by reference.

The phosphate esters utilized are generally obtained by esterifying 1 mole of phosphorus pentoxide with 2 to 4.5 moles of a nonionic surface active agent obtained by condensing at least 1 mole of ethylene oxide with 1 mole of a compound having at least 6 carbon atoms and a reactive hydrogen atom. These nonionic surface active agents are well known in the art and are generally prepared by condensing a polyglycol ether containing a suitable number of alkanoxy groups or a 1,2-alkylene oxide, or a substituted alkylene oxide such as a substituted propylene oxide, butylene oxide or preferably ethylene oxide with an organic compound containing at least 6 carbon atoms and a reactive hydrogen atom. Examples of compounds containing a reactive hydrogen atom are alcohols, phenols, thiols, primary and secondary amines and carboxylic and sulfonic acids and their amides. The amount of alkylene oxide or equivalent condensed with a reactive chain will generally depend upon the particular compound employed. About 20 to 85 percent by weight of combined alkylene oxide is generally obtained in a condensation product, however, the optimum amount of alkylene oxide or equivalent utilized will depend upon the desired hydrophobic-lipophilic balance desired.

Preferably, the nonionic surface active agents utilized are derivatives of alkylated and polyalkylated phenols, multibranched chain primary aliphatic alcohols having the molecular configuration of an alcohol and are produced by the Oxo process from a polyolefin of at least 7 carbon atoms or straight chain aliphatic alcohols of at least 10 carbon atoms. Examples of suitable nonionic surface active agent condensation products which can be in turn reacted with phosphorus pentoxide to produce the phosphate esters utilized as additives in the hydraulic fluids of the invention are exemplified below. In this list, "EO" represents "ethylene oxide" and the number preceding this abbreviation refers to the number of moles thereof reacted with 1 mole of the given reactive hydrogen-containing compound.

Nonylphenol+9–11 EO
Nonylphenol+2 EO
Dinonylphenol+7 EO
Dodecylphenol+18 EO
Caster oil+20 EO
Tall oil+18 EO
Oleyl alcohol+4 EO
Oleyl alcohol+20 EO
Lauryl alcohol+4 EO
Lauryl alcohol+15 EO
Hexadecyl alcohol+12 EO
Hexadecyl alcohol+20 EO
Octadecyl alcohol+20 EO
Oxo tridecyl alcohol:
 (From tetrapropylene)+7 EO
 (From tetrapropylene)+10 EO
 (From tetrapropylene)+15 EO
Dodecyl mercaptan+9 EO
Soya bean oil amine+10 EO
Rosin amine+32 EO
Coconut fatty acid amine+7 EO
Cocoa fatty acid+10 EO
Dodecylbenzene sulfonamide+10 EO
Decyl sulfonamide+6 EO
Oleic acid+5 EO
Polypropylene glycol (30 oxypropylene units)+10 EO The hydraulic fluids and metalworking compositions of the invention generally consist of about 60 percent to about 99 percent water and about 40 percent to about 1 percent of additives. These additives can consist of concentrates comprising combinations of the water-soluble esters of ethoxylated aliphatic acids and monohydric and polyhydric aliphatic alcohols, molybdenum or antimony compounds, a phosphate ester, and, in addition, can contain polymer thickening agents, defoamers, corrosion inhibitors and metal deactivators or chelating agents. Preferably, said fluids consist of about 75 percent to 99 percent water and about 25 percent to about 1 percent concentrate. The fluids are easily formulated at room temperature using distilled or deionized water although tap water can also be used without adverse effects on the fluid properties.

Stable concentrates of the hydraulic fluids and metalworking compositions of the invention can be prepared. These can be completely free of water as indicated below or contain any desired amount of water but preferably contain up to 75 percent by weight of water to increase fluidity and provide ease of blending at the point of use. These concentrates are typically diluted with water in the proportion of 1:99 to 10:90.

Representative concentrates are as follows:

TABLE I

| Hydraulic Fluid Concentrates | | | |
|---|---|---|---|
| Ingredient | % by Weight | | |
| Thickener of Example 4 | 50.0 | 50.0 | 50.0 |
| Alkylphosphate ester of Example 1 | 2.94 | 4.55 | 4.0 |
| Polyoxyethylene 20 sorbitan monostearate | 11.75 | 18.17 | 19.0 |
| Sulfurized oxymolybdenum or antimony organophosphorodithioate at 40% solids | 8.83 | 13.64 | 15.5 |
| Sodium-2-mercaptobenzothiazole | 11.77 | 6.06 | 4.0 |

TABLE I-continued

| Hydraulic Fluid Concentrates | | | |
|---|---|---|---|
| Ingredient | % by Weight | | |
| Morpholine | 14.71 | 7.58 | 7.5 |
| | 100.00 | 100.00 | 100.00 |

The proportions of phosphate ester to sulfurized molybdenum or antimony compound of the invention are generally about 0.1:1 to about 2:1 based upon the weight of the sulfur in the sulfurized molybdenum or antimony compounds. The proportion of the water-soluble ester of the ethoxylated aliphatic acid or alcohol to the sulfurized molybdenum or sulfurized antimony containing compound is about 0.5:1 to about 2:1 based upon the weight of the sulfur in the sulfur-containing compound. Preferably, the proportion of phosphate ester to sulfurized molybdenum or antimony compound is 0.5:1 to 1:1 and, preferably, the proportion of the ester of the ethoxylated aliphatic acid or alcohol to the sulfurized molybdenum compound is about 1:1 to about 1.5:1.

The concentration of sulfurized molybdenum or antimony compound to water in the hydraulic fluid or metal-working compositions of the invention is generally about 0.05 percent to about 3 percent by weight and the concentration of the phosphate ester to water in the hydraulic fluid or metal-working compositions of the invention is generally about 0.05 percent to about 1 percent by weight. The concentration of the water-soluble ester of the ethoxylated aliphatic acid or alcohol to water in the hydraulic fluid or metalworking compositions of the invention is generally about 0.1 percent to about 5 percent by weight. Preferably, these proportions by weight are respectively 0.75 percent to 0.5 percent, 0.25 percent to 0.5 percent, and 1 percent to 2 percent.

The Alpha-Olefin Epoxide Modified Polyether Polyol Thickening Agent

The modified polyether polyol thickening agents utilized to thicken the hydraulic fluids and metalworking fluids of the invention can be obtained in one embodiment of the invention by modifying a conventional polyether polyol thickening agent with an alpha-olefin epoxide having about 12 to about 18 carbon atoms or mixtures thereof. The conventional polyether polyol thickening agent can be an ethylene oxide homopolymer or a heteric or block copolymer of ethylene oxide and at least one lower alkylene oxide having 3 to 4 carbon atoms. Said ethylene oxide is used in the proportion of at least 10 percent by weight based upon the total weight of the polyether polyol. Generally, about 70 to 99 percent by weight ethylene oxide is utilized with about 30 to 1 percent by weight of lower alkylene oxide having 3 to 4 carbon atoms.

Polyether polyols are generally prepared utilizing an active hydrogen-containing compound in the presence of an acid or basic oxyalkylation catalyst and an inert organic solvent at elevated temperatures in the range of about 50° C. to 150° C. under an inert gas pressure generally from about 20 to about 100 pounds per square inch gauge. Generally, polyhydric alcohol initiators selected from the alkane polyols, alkene polyols, alkyne polyols, aromatic polyols, and oxyalkylene polyols are useful initiators. Polyether polyols suitable as thickeners can be prepared by further reacting a polyether polyol having a molecular weight of about 1000 to about 75,000, preferably 1000 to about 40,000 with said alpha-olefin epoxide so as to provide an alpha-olefin epoxide cap on the polyether polyol. Polyethers suitable as thickeners for the hydraulic fluids of the invention can be obtained by the heteric polymerization of ethylene oxide and said alpha-olefin epoxide. The amount of alpha-olefin epoxide required to obtain the modified polyether polyol thickening agents of the invention is about 1 to about 20 percent by weight based upon the total weight of the modified polyether polyol thickeners. Alternatively, the modified polyether polyol thickening agents can be obtained by the heteric copolymerization of a mixture of ethylene oxide and at least one other lower alkylene oxide having 3 to 4 carbon atoms with an alpha-olefin epoxide having about 12 to about 18 carbon atoms or mixtures thereof. Further details of the preparation of the alpha-olefin epoxide modified polyether polyol thickening agents useful in the preparation of the hydraulic fluids and metalworking fluids of the invention can be obtained in copending applications Ser. No. 86,839, filed on Oct. 22, 1979 and Ser. No. 86,840, filed Oct. 22, 1979 both incorporated herein by reference.

Generally, at least 10 percent by weight, preferably about 40 to 60 percent by weight of the modified polyether polyol is used together with about 60 to about 40 percent by weight of an unthickened hydraulic fluid or metalworking fluid concentrate.

The metal deactivators and corrosion inhibitors which can be added either to the concentrate or to the hydraulic fluid or metalworking compositions of the invention are as follows:

Liquid-Vapor Phase Corrosion Inhibitors

The liquid-vapor corrosion inhibitor can be any of the alkali metal nitrites, nitrates, phosphates, silicates and benzoates. Certain amines are also useful. The inhibitors can be used individually or in combinations. Representative examples of the preferred alkali metal nitrates and benzoates which are useful are as follows: sodium nitrate, potassium nitrate, calcium nitrate, barium nitrate, lithium nitrate, strontium nitrate, sodium benzoate, potassium benzoate, calcium benzoate, barium benzoate, lithium benzoate and strontium benzoate.

Representative amine type corrosion inhibitors are morpholine, N-methylmorpholine, N-ethylmorpholine, ethylenediamine, dimethylaminopropylamine, dimethylethanolamine, alpha- and gamma-picoline, piperazine and isopropylaminoethanol.

Particularly preferred vapor phase corrosion inhibiting compounds are morpholine and isopropylaminoethanol. As corrosion inhibitors, a proportion of from about 0.05 percent to about 2 percent by weight is used based upon the total weight of the hydraulic fluid or metalworking composition of the invention. Preferably, about 0.5 percent to about 2 percent by weight of these amines are used.

Metal Deactivators (Chelating Agents)

The metal deactivators are used primarily to chelate copper and copper alloys. Such materials are well known in the art and individual compounds can be selected from the broad classes of materials useful for this purpose such as the various triazoles and thiazoles as well as the amine derivatives of salicylidenes. Representative specific examples of these metal deactivators are as follows: benzotriazole, tolytriazole, 2-mercaptobenzothiazole, sodium 2-mercaptobenzothiazole, and N,N'-disalicylidene-1,2-propanediamine.

It is also contemplated to add other known corrosion inhibitors. Besides the amines, alkali metal nitrates, benzoates and nitrates listed above, the alkoxylated fatty acids are useful as corrosion inhibitors.

The phosphate ester and the esters of ethoxylated aliphatic aids and monohydric and polyhydric alcohols, as described above, are water-soluble in the sense that no special method is required to disperse these materials in water and keep them in suspension over long periods of time. The sulfurized molybdenum or antimony compounds on the other hand are insoluble in water and require emulsification prior to use, for instance, with anionic or nonionic surfactants. Useful representative anionic or nonionic surfactants are: sodium petroleum sulfonate, i.e., sodium dodecylbenzene sulfonate; polyoxyethylated fatty alcohol or fatty acid and polyoxyethylated alkyl phenol.

A typical recipe for the emulsification of the sulfurized molybdenum or antimony compound of the invention (sulfurized oxymolybdenum or oxyantimony organo-phosphorodithioates) is as follows:

|  | % by Weight |
|---|---|
| Emulsifier |  |
| Sodium dodecylbenzene sulfonate | 70 |
| Ethylene glycol monobutyl ether | 23 |
| Butyl alcohol | 7 |
|  | 100 |
| Emulsifiable concentrate (hereafter termed emulsion) |  |
| Sulfurized molybdenum or antimony compound | 40 |
| Emulsifier | 60 |
|  | 100 |

A typical high water-base hydraulic fluid or metalworking additive of the invention will contain the components shown in Table II.

TABLE II
Typical Composition of Hydraulic Fluid or Metalworking Additive

| Component | Parts by Weight |
|---|---|
| Water (distilled or deionized) | 2.5–32.5 |
| Polymeric thickener | 80–50 |
| Water-soluble ethoxylated ester | 3–10 |
| Molybdenum or antimony compound at 40% solids emulsion | 1–5 |
| Water-soluble alkyl phosphate ester | 0.1–1.0 |
| Metal deactivator | 0.1–0.5 |
| Corrosion inhibitor | 0.5–1.0 |

The hydraulic fluid and metalworking compositions of the invention, when formulated as above, are transparent liquids having a viscosity of up to 400 S.U.S. at 100° F., which are stable over long periods of storage at ambient temperature. In addition, the hydraulic fluids and metalworking additives of the invention are oil-free and will not support combustion in contrast to those flame-resistant fluids of the prior art based upon a glycol and water or petroleum oils. The hydraulic fluids and metalworking additives of the invention are ecologically clean and nonpolluting compositions when compared to existing petroleum-based hydraulic fluids. Since the hydraulic fluids and metalworking additives of the invention are largely based upon synthetic materials which are not derived from petroleum, the production of such fluids is relatively independent of shortages of petroleum oil and not materially influenced by the economic impact of such shortages.

The hydraulic fluids of the invention can be used in various applications requiring hydraulic pressures in the range of 200–2000 pounds per square inch since they have all the essential properties required such as lubricity, viscosity and corrosion protection. The hydraulic fluids of the invention are suitable for use in various types of hydraulic systems and are especially useful in systems in which vane-type pumps or the axial-piston pumps are used. Such pumps are used in hydraulic systems where pressure is required for molding, clamping, pressing metals, actuating devices such as doors, elevators, and other machinery or for closing dies in die-casting machines and in injection molding equipment and other applications.

In evaluating the hydraulic fluids of the invention, a test generally referred to as the Vickers Van Pump Test is employed. The apparatus used in this test is a hydraulic system which functions as follows: Hydraulic fluid is drawn from a closed sump to the intake side of a Vickers V-104C vane-type pump. The pump is driven by, and directly coupled to, a 25 horsepower, 1740 rpm electric motor. The fluid is discharged from the pump through a pressure regulating valve. From there it passes through a calibrated venturi (used to measure flow rate) and back to the sump. Cooling of the fluid is accomplished by a heat exchanger through which cold water is circulated. No external heat is required; the fluid temperature being raised by the frictional heat resulting from the pump's work on the fluid. Excess heat is removed by passing the fluid through the heat exchanger prior to return to the sump. The Vickers V-104C vane-type pump comprises a cylindrical enclosure (the pump body) in which there is housed a so-called "pump cartridge". The "pump cartridge" assembly consists of front and rear circular, bronze bushings, a rotor, a cam-ring and rectangular vanes. The bushings and cam-ring are supported by the body of the pump and the rotor is connected to a shaft which is turned by an electric motor. A plurality of removable vanes are inserted into slots in the periphery of the rotor. The cam-ring encircles the rotor and the rotor and vanes are enclosed by the cam-ring and bushings. The inner surfact of the cam-ring is cam-shaped. Turning the rotor results in a change in displacement of each cavity enclosed by the rotor, the cam-ring, two adjacent vanes and the bushings. The body is ported to allow fluid to enter and leave the cavity as rotation occurs.

The Vickers Vane Pump Test procedure used herein specifically requires charging the system with 5 gallons of the test fluid and running at temperatures ranging from 100° to 135° F. at 750 to 1000 psi pump discharge pressure (load). Wear data were made by weighing the cam-ring and the vanes of the "pump cartridge" before and after the test. At the conclusion of the test run and upon disassembly for weighing, visual examination of the system was made for signs of deposits, varnish, corrosion, etc.

The following examples more fully describe the hydraulic fluids of the invention and show the unexpected results obtained by their use. The examples are intended for the purpose of illustration and are not to be construed as limiting in any way. All parts, proportions, and percentages are by weight and all temperatures are in degrees centrigrade unless otherwise noted.

EXAMPLES 1-3

(Control or Comparative Examples)

Hydraulic fluid concentrates were prepared having the compositions in percent by weight of:

| Ingredient | Example 1 | Example 2 | Example 3 |
|---|---|---|---|
| Polyoxyethylene 20 sorbitan monostearate | 23.53 | 36.36 | 38.00 |
| Sulfurized oxymolybdenum organophosphordithioate | 17.65 | 27.27 | 31.00 |
| Alkylphosphate ester | 5.88 | 9.10 | 8.00 |
| Mopholine | 29.41 | 15.15 | 15.00 |
| Sodium-2-mercaptobenzothiazole | 23.53 | 12.12 | 8.00 |

The fluids were clear, dark amber in color, free flowing and showed no phase separation upon aging at room temperature. Upon diluting the concentrates with tap water to obtain hydraulic fluids containing 1, 3 and 5 percent of each of the concentrates, homogeneous mixtures were obtained.

The alkyl phosphate ester utilized in these examples was obtained by the reaction of two moles of phosphorus pentoxide with the surface-active agent condensation product obtained by reacting one mole of oleyl alcohol and 4 moles of ethylene oxide.

EXAMPLE 4

In this example, a heteric copolymer of ethylene oxide and 1,2-propylene oxide is prepared having a molecular weight of about 23,000. Subsequently, this base heteric copolymer is further reacted with a mixture of alpha-olefin epoxides having 15 to 18 carbon atoms sold under the trademark VIKOLOX 15-18 by the Viking Chemical Company.

A conventional polyether derived from ethylene oxide and 1,2-propylene oxide in the ratio of 75 percent ethylene oxide and 25 percent 1,2-propylene oxide was prepared by reaction with trimethylol propane in two stages in a stainless steel autoclave. An intermediate product was first prepared by reacting a mixture of trimethylol propane, potassium hydroxide, 1,2-propylene oxide, and ethylene oxide for a period of 18 hours at 120° C. The cooled liquid product was discharged into a glass container.

The base copolymer product was prepared by reacting this intermediate product with propylene oxide and ethylene oxide under a nitrogen atmosphere at 115° C. for 22 hours. The reaction mixture was then cooled and the viscous liquid product transferred to a glass container. The product had a molecular weight of about 23,000.

Into a two-gallon stainless steel mixer there was charged 3400 grams of the copolymer prepared in Example 4. The contents of the mixer were blanketed with nitrogen and then heated by steam utilizing an external jacket on the mixer. There was then added 6.8 grams of sodium and the mixture was stirred while the reaction was allowed to continue. After 3.5 hours, 34 grams of a mixture of alpha-olefin oxides having an aliphatic chain length of 15 to 18 carbon atoms sold under the trademark VIKOLOX 15-18 by the Viking Chemical Company, was added at once. The stirring and heating was continued for another 43 hours before the reaction mixture was cooled and the viscous product transferred to a glass container.

Tables III-V respectively, show the viscosity of the concentrate of Example 3 when diluted with tap water to make a hydraulic fluid, the viscosity of the alpha-olefin epoxide modified polyether polyol thickener of Example 4 upon dilution with water, and the use of five percent by weight of the concentrate of Example 3 in combination with 5 to 7.5 percent of the alpha-olefin epoxide modified polyether polyol of Example 4. The surprising increase in viscosity shown in Table V for the combination of thickener and hydraulic fluid concentrate is unexpected and advantageous in that lesser amounts of thickener would be required to produce a thickened hydraulic fluid or metalworking lubricant thus resulting in a cost saving.

TABLE III

Viscosity of Hydraulic Fluid From Concentrate of Example 3 in Water

| Concentration in Water (% by weight) | Viscosity (SUS) at 100° F. |
|---|---|
| 1.0 | 34 |
| 3.0 | 54 |
| 5.0 | 56 |

TABLE IV

Viscosity of Thickener of Example 4 in Water

| Concentration in Water (% by weight) | Viscosity (SUS) at 100° F. |
|---|---|
| 5.0 | 34 |
| 5.5 | 37 |
| 6.0 | 42 |
| 7.5 | 56 |

TABLE V

Viscosity of Mixtures of the Concentrate of Example 3 & the Thickener of Example 4 in Water

| Concentration in Water (% by weight) | | Viscosity (SUS) at 100° F. |
|---|---|---|
| Example 3 | Example 4 | |
| 5.0 | 5.0 | 120 |
| 5.0 | 5.5 | 250 |
| 5.0 | 6.0 | 335 |
| 5.0 | 7.5 | 1295 |

EXAMPLE 5

Using 6 percent by weight of the thickener of Example 4 and 5 percent by weight of the hydraulic fluid concentrate of Example 3 with the remainder of the composition tap water, a water-based hydraulic fluid having a viscosity of 335 SUS was prepared and tested for stability under conditions of high shear in a Vickers V-104C hydraulic vane pump. The hydraulic fluid was tested at 1000 pounds per square inch pressure at a temperature of 100° F. for a period of 194 hours. Samples of the hydraulic fluid were taken at various time intervals during the test and the viscosity determined. The variation in viscosity is indicative of the shear stability of the hydraulic fluid.

TABLE VI

Vickers Vane Pump Test - Shear Stability of Hydraulic Fluid of Example 5

| Test Time (hours) | Viscosity (SUS) at 100° F. | Viscosity % loss |
|---|---|---|
| 0 | 335 | |
| 6 | 322 | 3.88 |
| 92 | 319 | 4.78 |

TABLE VI-continued

Vickers Vane Pump Test - Shear Stability of Hydraulic Fluid of Example 5

| Test Time (hours) | Viscosity (SUS) at 100° F. | Viscosity % loss |
|---|---|---|
| 153 | 299 | 10.75 |
| 194 | 277 | 17.31 |

As shown in Table VI, the overall change in viscosity of the fluid after 194 hours running time is less than 20 percent which indicates good shear stability performance in the Vickers Vane Pump.

The hydraulic fluid of Example 5 was also tested for wear performance in a hydraulic vane pump. The test was conducted in the Vickers V-104C vane pump at 1000 pounds per square inch pressure, at a temperature of 100° F., for a period of 194 hours. Ring and vane wear losses were determined at various time intervals and the results are shown in Table VII.

TABLE VII

Vickers Vane Pump Test - Wear Performance of Hydraulic Fluid of Example 5

| Test Time (hours) | Wear-loss in Weight (total) Ring and Vanes (grams) |
|---|---|
| 72 | 1.48 |
| 113 | 1.97 |
| 153 | 2.60 |
| 194 | 3.65 |

The weight loss of the ring and vanes shown in Table VII is indicative of acceptable lubricity performance in the vane pump.

While this invention has been described with reference to certain embodiments, it will be recognized by those skilled in the art that many variations are possible without departing from the scope and spirit of the invention and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A hydraulic fluid or metalworking fluid concentrate capable of imparting to water the properties of a lubricant such as resistance to extreme pressure and corrosion inhibition, said concentrate consisting essentially of:

A. a water-soluble polyoxyethylated aliphatic ester consisting of esters of ethoxylated aliphatic monohydric and polyhydric alcohols and ethoxylated aliphatic acids wherein at least one of said acids or alcohols have about 5 to about 20 moles of ethylene oxide added per mole of acid or alcohol and wherein said alcohols and acids have carbon chain lengths of 8 to 36 carbon atoms and wherein said esters are produced by first polyoxyethylating at least one of said acids or alcohols and second, obtaining the ester reaction product thereof, B. a sulfurized metallic compound of the formula:

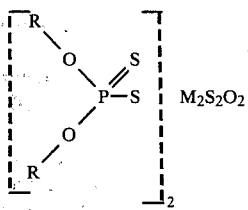

wherein M is molybdenum or antimony and wherein R is selected from the group consisting of alkyl, aryl, alkylaryl radicals and mixtures thereof having 3 to 20 carbon atoms in the alkyl group and wherein the ratio of said water-soluble ester to said sulfurized metallic compound is from 5:1 to 2:1 by weight based upon the weight of the sulfur in said metallic compound, C. a phosphate ester salt selected from the group consisting of

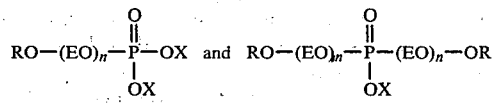

and mixtures thereof, wherein EO is ethylene oxide; R is selected from the group consisting of linear or branched chain alkyl groups having about 6 to 30 carbon atoms or alkylaryl groups wherein said alkyl groups have 6 to 30 carbon atoms; X is selected from the residue of ammonia, an amine and an alkali or alkaline earth metal or mixtures thereof, n is a number from 1 to 50 and wherein the proportion of said phosphate ester to said sulfurized metallic compound is about 0.1:1 to about 2:1 based upon the weight of the sulfur in said metallic compound, D. a polyether polyol thickener having a molecular weight of about 1000 to about 75,000, prepared by reacting ethylene oxide or ethylene oxide and at least one lower alkylene oxide having 3 to 4 carbon atoms with at least one active hydrogen-containing compound containing at least two active hydrogens and subsequently at least one alpha-olefin oxide having a carbon chain length of about 12 to about 18 aliphatic carbon atoms and wherein said alpha-olefin oxide is present in the amount of 1 to about 20 percent by weight based upon the total weight of said thickener, and optionally E. a corrosion inhibitor and a metal deactivator.

2. The composition of claim 1 wherein said phosphate ester is the ester of the reaction product of 4 moles of ethylene oxide with 1 mole of oleyl alcohol esterified by reacting 1 mole of said reaction product with 2 moles of phosphorus pentoxide.

3. A hydraulic fluid or metalworking lubricant fluid consisting essentially of water and the concentrate of claim 2 wherein said fluid consists of about 60 percent to about 99 percent water and about 40 percent to about 1 percent concentrate.

4. A hydraulic fluid or metalworking composition consisting essentially of water and the concentrate of claim 2 wherein said concentrate consists of about 50 percent to about 80 percent of said thickener.

5. The hydraulic fluid of claim 3 wherein said corrosion inhibitor is selected from the group consisting of an alkali metal benzoate, nitrate and nitrite, an amine, and mixtures thereof.

6. The hydraulic fluid of claim 5 wherein said amine corrosion inhibitor is morpholine.

7. The composition of claim 6 wherein said metal deactivator is the triethanolamine salt of 2-mercaptobenzothiazole.

8. The concentrate of claim 2 wherein said polyether polyol is prepared by copolymerizing a mixture of said reactants to produce a liquid heteric copolymer.

9. The concentrate of claim 2 wherein said polyether polyol is prepared by copolymerizing a mixture of ethylene oxide and at least one of said lower alkylene oxides in the presence of an active hydrogen-containing compound selected from the group consisting of alkane polyols, alkene polyols, and alkyne polyols to produce a liquid heteric copolymer intermediate and subsequently reacting said intermediate with at least one of said alpha-olefin oxides.

10. The concentrate of claim 2 wherein said polyether polyol is prepared by sequentially reacting ethylene oxide with at least one of said lower alkylene oxides to produce a block copolymer intermediate and subsequently reacting said intermediate with at least one of said alpha-olefin oxides.

11. The concentrate of claim 9 wherein said lower alkylene oxides are selected from the group consisting of propylene oxide, 1,2-butylene oxide, 1,3-butylene oxide, 1,4-butylene oxide, 2,3-butylene oxide, and tetrahydrofuran and wherein the proportion of ethylene oxide residue in said thickener is at least 10 percent by weight of the total weight of said thickener.

12. The concentrate of claim 11 wherein the proportion of ethylene oxide residue to the residue of said lower alkylene oxide is from about 70 to about 99 percent by weight of ethylene oxide residue to about 30 to about 1 percent by weight of said lower alkylene oxide residue and said active hydrogen-containing compound is a polyhydric alcohol having from 2 to 10 carbon atoms and from 2 to 6 hydroxyl groups.

13. The concentrate of claim 12 wherein said initiator is an alkane polyol selected from the group consisting of at least one of trimethylolpropane, glycerol, 2,3,5,6-hexanetetrol, sorbitol, and pentaerythritol and the molar ratio of said initiator to the combined molar amounts of said ethylene oxide, said lower alkylene oxides, and said alpha-olefin oxide is in a mole ratio of about 1:5 to about 1:15.

14. A process of metalworking comprising working metal in the presence of the metalworking composition of claim 4.

15. A process for the transmitting of force hydraulically comprising transmitting force utilizing the hydraulic fluid of claim 3.

* * * * *